July 15, 1941.  H. J. GRAHAM  2,249,357
VEHICLE LIGHTING FIXTURE
Filed May 12, 1939
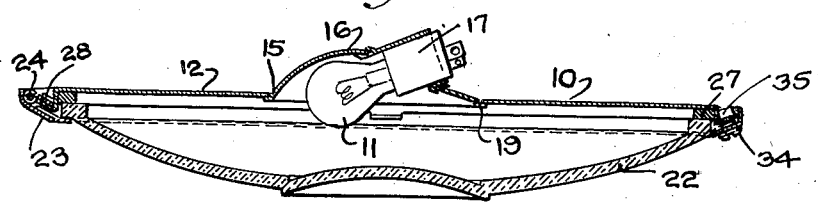
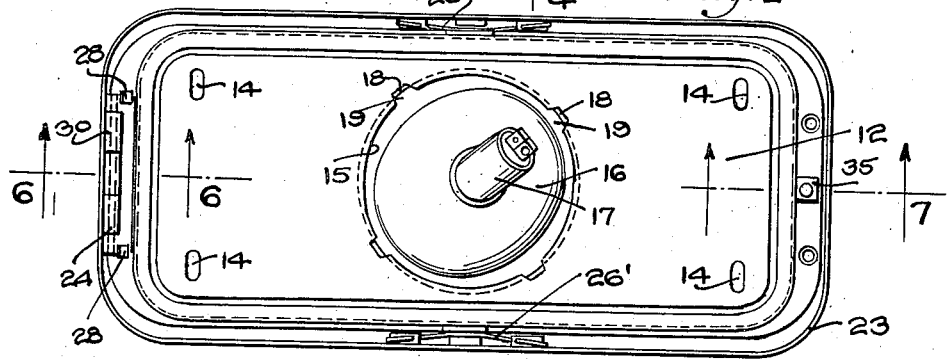
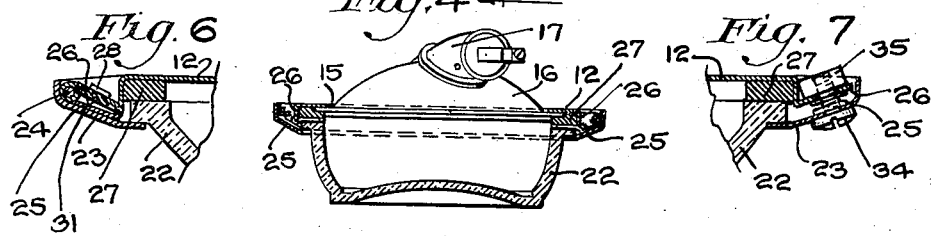
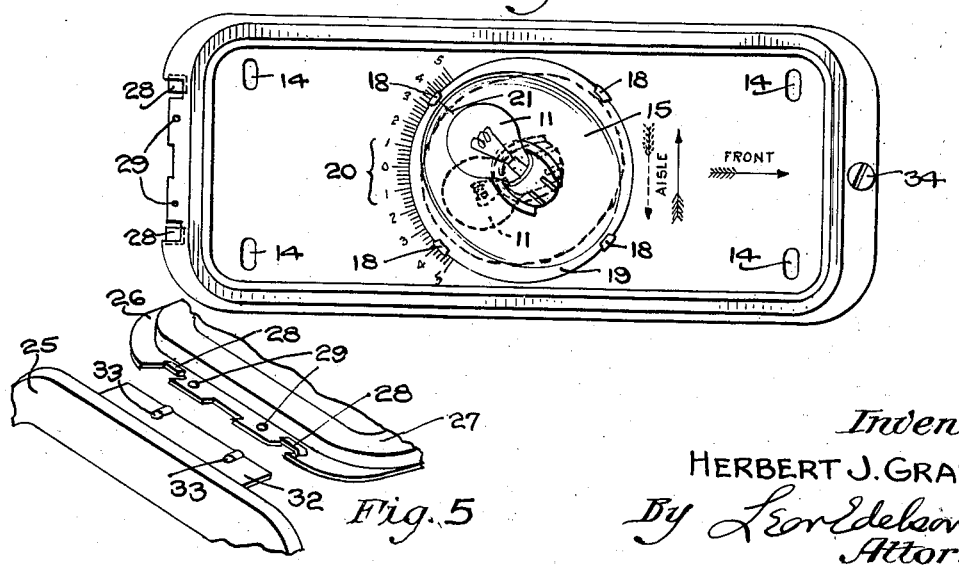
Inventor:
HERBERT J. GRAHAM
By Leo Edelson
Attorney.

Patented July 15, 1941

2,249,357

UNITED STATES PATENT OFFICE 2,249,357

VEHICLE LIGHTING FIXTURE

Herbert J. Graham, Philadelphia, Pa., assignor to Electric Service Supplies Company, Philadelphia, Pa., a corporation of Pennsylvania Application May 12, 1939, Serial No. 273,166

7 Claims. (Cl. 240—7.35)

This invention relates generally to lighting units and more particularly to such as are designed for use as ceiling lights, for railway vehicles, automotive buses and the like wherein it is customary to mount a plurality of ceiling lights above the heads of the passenger seated in the vehicle, the lights being usually arranged in rows extending longitudinally of the vehicle and to either side of the middle aisle thereof.

It is essential in the proper mounting of vehicle lights that each be located to provide maximum illumination for the passengers and at the same time insure against annoying glare not only in the eyes of the passengers but also in the eyes of the driver of the vehicle. To that end, it is an object of the present invention to provide a ceiling light of such character that when properly mounted in the vehicle ceiling the light beam is projected downwardly and forwardly in such manner that the beam pattern is confined within the side limits of the passenger seats, while the axis of the beam is inclined forwardly with respect to a vertical line extending through the center of the light source. By so disposing a plurality of ceiling lights in laterally spaced, longitudinally extending rows arranged to either side of the aisle normally provided between the opposed longitudinally extending rows of seats, none of the light rays are directed into the faces of the passengers and there is little, if any, reflection of these rays forwardly of the vehicle interior such as would be reflected by the front windshield back into the eyes of the driver.

Due to the transverse curvature of the vehicle ceiling, it is normally necessary to provide in each vehicle groups of what may be termed right and left-hand ceiling lights, one group being designed to be mounted over one row of seats while the other group is designed to be mounted over the other row of seats, the ceiling lights of each group being respectively designed to cast their beams in opposite directions in order to insure the attainment of the above set forth desired lighting conditions. Inasmuch as the ceiling lights employed in a single vehicle are identical in external appearance, it has been necessary heretofore and prior to this invention to provide the so-called right and left-hand units for use in a single vehicle.

The present invention aims to overcome this necessity for constructing separate right and left-hand ceiling units by providing a type of construction within which is adapted to be mounted a lamp and its associated reflector, the mounting of the latter within the housing being effected in such manner that the direction of the light beam emanating from the lamp housing may be varied as desired without involving or necessitating any change in the construction or design or in the location of the lamp housing per se. By so constructing the ceiling lights in accordance with the present invention, the manufacture thereof may be so standardized that the several parts which go to make up a complete ceiling light unit are of identical construction irrespective of whether the units are to be located on the right or left-hand side or at any other point in the vehicle ceiling, these standardized parts being so designed that they may be interchangeably assembled to provide for the projection of the beam in any desired direction, the assembled lighting units being in all other respects identical.

A further object of the present invention is to provide a ceiling light unit wherein means is provided for so adjustably mounting a reflector and its associated lamp socket within the main casing for the lighting unit as to insure the projection of the light beam from the unit in any desired direction and in this connection it is a further object of the present invention to provide each casing and its associated reflector with suitable indexing marks which are standard for all lighting units of a given type constructed in accordance with the present invention to insure proper relative assembly of any given reflector within a given lamp housing or casing in accordance with a predeterminedly established setting. Thus, having once established the proper setting of a reflector within its lamp housing, the indexing provided in accordance with the present invention makes it possible without further individual adjustments of the lighting units to readily assemble any desired number of lighting units having identical light projecting characteristics.

Further objects of the present invention, such as those relating to details of construction and economies of manufacture which are characteristic of the lighting unit constructed in accordance with the present invention and which facilitate the economical manufacture in quantities of lighting units having different light projecting characteristics but which are in all other respects identical in construction will appear more fully hereinafter.

The invention consists substantially in the combination, construction, location and relative arrangement of parts, all as will appear more fully hereinafter, as shown in the accompanying drawing and as finally pointed out in the appended claims.

In the said accompanying drawing, which is illustrative of a preferred type of lighting unit constructed in accordance with the present invention:

Figure 1 is a longitudinally sectional view of such lighting unit;

Figure 2 is a plan view of the back side of such lighting unit;

Figure 3 is a plan view of the front side of the lighting unit with the lens removed therefrom;

Figure 4 is a sectional view taken on the line 4—4 of Figure 2;

Figure 5 is a view illustrating the manner of connecting together the hinged ends of the casing and its front lens-equipped cover;

Figure 6 is an enlarged sectional view taken along the line 6—6 of Figure 2 showing the detail of said hinged connection; and Figure 7 is an enlarged sectional view taken along the line 7—7 of Figure 2.

Referring now to the drawing, it will be observed that the lighting unit of the present invention essentially comprises a casing or housing, designated generally by the reference numeral 10, within which is adapted to be disposed a lamp 11. The lamp casing 10 generally comprises a rigid metal back plate 12 which is adapted to be secured against a suitable supporting surface, such as the ceiling of an automotive bus or other such vehicle, and a front closure within which is fitted a closure of glass or other such suitable light-transmitting material. The supporting back 12 of the lamp housing is provided with suitable apertures 14 through which are adapted to be projected securing screws or the like for mounting the unit against its supporting surface. Formed centrally in the back plate 12 of the lamp housing is a circular opening 15 within which is fitted a lamp reflector 16, this latter being equipped with a suitable lamp socket 17.

The circular opening 15 in the back plate 12 is provided with a plurality of circumferentially spaced struck-out tabs 18, while the reflector 16 is provided with a plane annular flange 19 of a diameter somewhat greater than that of the opening 15 so that when the reflector 16 is disposed within the circular opening 15 of the housing back plate 12, the said circular flange 19 engages flatwise against the marginal edge of the said opening 15 and is there secured in position by the tabs 18 as shown most clearly in Figure 3. The tabs 18 thus serve to locate the reflector centrally within the opening 15 as well as to secure it fixedly in said opening in the desired angular relation with respect to said opening.

As appears most clearly in Figure 3, the inner surface of the housing back plate 12 is provided with an indexing scale 20 arranged immediately adjacent one side of the central opening 12 therein. It will be observed that this scale is graduated uniformly from a central point located in the longitudinally extending median plane of the lighting unit along an arc extending in opposite directions from said plane, the central point of the scale being designated for convenience by the cipher zero (0). As also appears most clearly in Figure 3, the reflector 16 is provided in the plane annular flange 19 thereof with an index 21. By means of the indexing scale 20 provided in the lamp housing back 12 and its coacting index 21 provided in the reflector 16, any number of lighting units may be produced with the assurance that in all of them the reflector is similarly positioned with respect to the lighting unit base 12 to insure that the light beams projected from such units are identical. Thus, if it be predeterminedly established that the proper position for the reflector with respect to its supporting plate 12 is as shown in Figure 3, that is, with the index 21 in coincidence with the index scale numeral (3.6), then it is merely necessary to so angularly relate the reflector 16 with respect to its supporting plate 12 as to bring the index 21 into registry with the desired numeral on the index scale and this operation would be repeated in all lighting units which are desired to provide identical projections of the light beam from the lighting unit. It will, of course, be understood that the desired angular relation of the reflector 16 within its supporting plate 12 is effected before the tabs 18 are bent over as in Figure 3, these tabs being so bent over to clamp the reflector in its desired adjusted position only after the desired setting is effected. Once these tabs are crimped over, as shown in Figure 3, the reflector is secured immovably within its supporting plate 12.

It will be observed that in the type of ceiling unit shown in the figures (see particularly Figure 1), the light beam from the lamp 11 is reflected by the reflector 16 downwardly of the plate 12 and along a line inclined with respect to the vertical. As most clearly appears by reference to Figure 3, had the reflector been so angularly related with respect to its supporting plate 12 that the index 21 were in registry with the zero or central point of the indexing scale, the beam cast from the reflector would have been downwardly inclined with its central axis disposed in the longitudinal median plane of the reflector. With the reflector set as in Figure 3, however, the central axis of the downwardly projected beam extends across the longitudinal median plane of the lighting unit, that is, in a direction forwardly and to one side of the longitudinal median plane of the unit.

It will be observed in Figure 3 that the back plate 12 of the lighting unit has impressed on its lower surface arrows which respectively point toward the front and toward the aisle of the vehicle. Thus, the particular assembly illustrated in Figure 3 is of a lighting unit adapted to be mounted over that row of seats in a vehicle to the left of the passenger when standing in the center aisle and facing forwardly. When a group of lights assembled as shown in Figure 3 is mounted above the left-hand row of seats, the light beams projected from the lighting units will in each case be projected downwardly toward the heads of the passengers seated in such seats and along a line inclined forwardly of the vehicle and toward the left-hand side thereof. This will insure maximum illumination within the seat area with little or no light being projected from such left-hand row of ceiling units across the aisle into the area occupied by the passengers seated on the right-hand side of the vehicle.

By employing an identical group of parts as just described, a second set of ceiling lights may be assembled for mounting over the right-hand row of seats. In the case of this second set of ceiling units, the reflectors 16 thereof would be so angularly related with respect to their supporting plates 12 as to cause the beams projected therefrom to be inclined forwardly and to the right of the vehicle interior instead of forwardly and to the left of the vehicle interior as in the case of the left-hand group of lighting units. This is readily effected in the assembly of the units by so angularly relating the reflector 16 with respect to its supporting plate 12 as to bring the index 21 into registry with the corresponding numeral in the other half of the index scale, e. g., the numeral (3.6). This setting of the reflector within its support for use over the right-hand row of seats in the vehicle is shown by the broken-line representation of the lamp and aisle-indicating arrow in Figure 3 of the drawing.

As has been indicated, the reflector 16 is adjustably secured in and forms a part of the supporting back plate 12 of the unit. Completing the unit is a front enclosure 22 of glass or other suitable light transmissible material, this enclosure being mounted within a supporting frame 23 pivotally secured, as at 24, to the back plate 12. As most clearly appears in Figures 1, 5, 6 and 7, the closure frame 23 is in the form of a stamping having a rectangular opening within which is fitted the glass enclosure 22, the frame being provided with a perimetral flange 25 which is adapted to overlie and fit rather snugly against a corresponding perimetral flange 26 formed on the back plate 12. The glass member 22 is retained in position within its frame 23 by spring-pressed wire retainers 26'—26' (see Figure 2), and when the pivoted closure is locked against the back plate the inner edge of the glass member 22 is firmly pressed against a rubber or like cushioning gasket 27 disposed in intervening relation between the glass and the back plate 12.

In order to render the pivoted glass-equipped front closure readily removable from the back plate 12, a quick-detachable connection is provided between the pivotally connected ends of the back plate 12 and the closure frame 23, as is best shown in Figures 3 to 6, inclusive. It will be observed that the back plate is provided at one end thereof with a pair of laterally spaced struck-out tabs 28—28 and with an intermediate pair of projections 29—29. The tabs 28—28 lie in a plane spaced from the plane of the flange from which the tabs were struck out.

The closure frame 23 is in turn provided with a hinge 30 one leaf 31 of which is permanently secured to the frame 23 while the other hinge leaf 32 extends free of the said closure frame and is provided with a pair of laterally spaced depressions 33—33. The hinge leaf 32 is of a width adapting it to be fitted between the aforesaid tabs 28—28 on the back plate 12, while the depressions 33—33 are so spaced in correspondence with the projections 29—29 that when the hinge leaf 32 is inserted between the tabs 28—28 the said projections 29—29 respectively seat in the depressions 33—33 to retain the members 12 and 23 in interconnected relation.

Respectively secured to the opposite extremities of the hingedly connected members 23 and 12 is a screw 34 and a fixed nut 35 which coact to lock the members 12 and 23 in the closed relation shown in Figures 1 and 7. In order to effect separation of the front closure member from the back plate 12, it is only necessary to withdraw the screw 34 from its nut 35 and then slip the hinge leaf 32 out of engagement with the end flange of the back plate 12.

It will be understood, of course, that the present invention is susceptible of various modifications and changes which may be made from time to time without departing from the general principles or real spirit thereof as defined in the appended claims.

What is claimed as new and useful is:

1. A lighting fixture including a pair of complementally formed members which cooperate to provide a housing for a lamp, one of said members being opaque and constituting the support for said fixture and the other of said members being fitted with a light transmissible window said opaque member having an opening therein, a reflector having an annular flange disposed flatwise against the marginal edge of the opening in said opaque member whereby said reflector is secured to and forms part of said opaque member, said reflector carrying in fixed relation therewith a lamp socket and being adjustable angularly about the axis of said opening, and indexing means on said opaque member and said reflector for positioning said reflector in accordance with a predeterminedly established setting.

2. A lighting fixture including a pair of complementally formed members which cooperate to provide a housing for a lamp, one of said members being opaque and constituting the support for said fixture and the other of said members being fitted with a light transmissible window said opaque member having an opening therein, a reflector having an annular flange disposed flatwise against the marginal edge of the opening in said opaque member whereby said reflector is secured to and forms part of said opaque member, said reflector carrying in fixed relation therewith a lamp socket and being adjustable angularly about the axis of said opening, an indexing means on said opaque member and said reflector for positioning said reflector in accordance with a predeterminedly established setting, and means for immovably securing said reflector to said opaque member in said predeterminedly adjusted position.

3. In a lighting unit of the character described, in combination, a main supporting plate having a central opening therein, a reflector fitted within said opening and adapted to be angularly adjusted within said opening, an index scale and an index point respectively provided in proximate margins of said reflector and the opening within which it is fitted whereby upon effecting registry of said indexing point with a predetermined point on said indexing scale the reflector assumes a predeterminedly established setting within said apertured support therefore said reflector being provided with a fixedly associated lamp socket, and means for securing said reflector immovably in said predeterminedly adjusted position.

4. In a lighting fixture, a main supporting plate having a central opening therein, a light reflecting member fitted within said opening, said light reflecting member including a fixedly located lamp socket adapted to accommodate a lamp in such manner that said reflecting member reflects the light rays from the lamp at an angle with respect to the plane of said plate supporting member, and means for angularly relating said reflecting member within said plate opening whereby to vary the angle of said reflected light with respect to the longitudinal median plane of said supporting plate while maintaining said first-mentioned angle of reflection constant.

5. In a lighting fixture, a main supporting plate having a central opening therein, a light reflecting member fitted within said opening, said light reflecting member including a fixedly located lamp socket adapted to accommodate a lamp in such manner that said reflecting member reflects the light rays from the lamp at an angle with respect to the plane of said plate supporting member, means for angularly relating said reflecting member within said plate opening whereby to vary the angle of said reflected light with respect to the longitudinal median plane of said supporting plate while maintaining said first-mentioned angle of reflection constant, and coacting indexing means on said reflecting member and supporting plate adapted to insure assembly of said reflecting member and said supporting plate in accordance with a predeterminedly established setting.

6. In a lighting fixture, a main supporting plate having a central opening therein, a light reflecting member fitted within said opening, said light reflecting member including a fixedly located lamp socket adapted to accommodate a lamp in such manner that said reflecting member reflects the light rays from the lamp at an angle with respect to the plane of said plate supporting member, means for angularly relating said reflecting member within said plate opening whereby to vary the angle of said reflected light with respect to the longitudinal median plane of said supporting plate while maintaining said first-mentioned angle of reflection constant, coacting indexing means on said reflecting member and supporting plate adapted to insure assembly of said reflecting member and said supporting plate in accordance with a predeterminedly established setting, and a light transmissible closure member secured to said back plate to constitute with the latter a closed housing for the lamp protectively associated with said reflector.

7. In a lighting fixture of the character described, a pair of complementally formed members adapted for assembly to jointly form a closed housing for a source of light, one of said members being provided with a light transmissible member, and means for hingedly connecting together corresponding ends of said members, said means including a slip-joint connection for effecting quick-detachable disengagement of said members one from the other, one element of said slip-joint connection including a leaf type hinge which is secured to one of said members and which is provided with a freely extending hinged leaf adapted to be frictionally retained by the corresponding end of the other of said members.

HERBERT J. GRAHAM.